United States Patent
Cheng (10) Patent No.: US 9,482,937 B2
(45) Date of Patent: Nov. 1, 2016

(54) ILLUMINATION SYSTEM AND PROJECTION APPARATUS

(71) Applicant: Chuan-Te Cheng, Hsin-Chu (TW)

(72) Inventor: Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 79 days.

(21) Appl. No.: 14/690,475

(22) Filed: Apr. 20, 2015

(65) Prior Publication Data

US 2016/0147135 A1    May 26, 2016

(30) Foreign Application Priority Data

Nov. 26, 2014 (TW) .............................. 103140968 A (51) Int. Cl.
| | |
|---|---|
| G03B 21/28 | (2006.01) |
| G03B 21/14 | (2006.01) |
| H04N 9/31 | (2006.01) |
| G03B 21/20 | (2006.01) |
| F21V 8/00 | (2006.01) |
| G03B 21/00 | (2006.01) |

(52) U.S. Cl.
CPC ........... *G03B 21/204* (2013.01); *G02B 6/0001* (2013.01); *G03B 21/005* (2013.01); *G03B 21/208* (2013.01); *G03B 21/2013* (2013.01); *G03B 21/2033* (2013.01); *G03B 21/2066* (2013.01); *H04N 9/3108* (2013.01); *H04N 9/3111* (2013.01)

(58) Field of Classification Search
CPC ........... G03B 21/2033; G03B 21/208; G03B 21/005; G03B 21/006; G03B 21/008; G03B 21/2066; F21Y 2113/005; F21Y 2103/003; F21L 14/023; H04N 9/31; H04N 9/3108; H04N 9/3111

USPC ............................ 353/31, 33, 34, 37, 98, 99
See application file for complete search history.

(56) References Cited

U.S. PATENT DOCUMENTS

| | | | |
|---|---|---|---|
| 6,005,722 A | * | 12/1999 | Butterworth ......... H04N 9/3114 348/742 |
| 8,098,375 B2 | | 1/2012 | Brukilacchio |
| 8,684,555 B2 | | 4/2014 | Hofmann et al. |

(Continued)

FOREIGN PATENT DOCUMENTS

| | | |
|---|---|---|
| TW | 200815806 | 4/2008 |
| TW | 200905358 | 2/2009 |
| TW | 201137493 | 11/2011 |

OTHER PUBLICATIONS

"Office Action of Taiwan Counterpart Application", issued on Jun. 3, 2016, p. 1-p. 6.

*Primary Examiner* — William C Dowling
(74) *Attorney, Agent, or Firm* — Jianq Chyun IP Office (57) ABSTRACT

An illumination system including a plurality of light source units, at least one light concentrating unit, at least one taper tunnel and a light consolidating unit is provided. The light concentrating unit corresponds to and is disposed beside one of the light source units. The light concentrating unit has a first illuminating surface, the light source unit corresponding to the light concentrating unit has a second illuminating surface, and the other light source units not corresponding to the concentrator have a third illuminating surface, respectively. The concentrator is disposed between the taper tunnel and the light source unit, and the taper tunnel has a fourth illuminating surface. The light consolidating unit has a fifth illuminating surface. The area of the fourth illuminating surface, and each of the third illuminating surfaces corresponds to each other. A projection apparatus is also provided.

22 Claims, 7 Drawing Sheets

(56) References Cited

U.S. PATENT DOCUMENTS

| | | | |
|---|---|---|---|
| 2005/0185419 A1* | 8/2005 | Holman | G02B 5/045 362/561 |
| 2005/0237764 A1* | 10/2005 | Jain | F21V 7/0025 362/551 |
| 2005/0243570 A1* | 11/2005 | Chaves | F21K 9/00 362/551 |
| 2005/0270775 A1* | 12/2005 | Harbers | G02B 27/1046 362/231 |
| 2007/0280622 A1 | 12/2007 | Rutherford | |
| 2009/0052014 A1* | 2/2009 | Chou | G03B 21/2013 359/333 |
| 2009/0147221 A1* | 6/2009 | Krijn | G02B 27/1046 353/33 |
| 2009/0244923 A1 | 10/2009 | Hofmann et al. | |
| 2012/0170002 A1* | 7/2012 | Ouderkirk | H04N 9/3164 353/30 |
| 2014/0098560 A1 | 4/2014 | Brukilacchio | |

* cited by examiner

ILLUMINATION SYSTEM AND PROJECTION APPARATUS

CROSS-REFERENCE TO RELATED APPLICATION

This application claims the priority benefit of Taiwan application serial no. 103140968, filed on Nov. 26, 2014. The entirety of the above-mentioned patent application is hereby incorporated by reference herein and made a part of this specification.

BACKGROUND OF THE INVENTION

1. Field of the Invention

The invention relates to an optical system and a display apparatus, and particularly relates to an illumination system and a projection apparatus.

2. Description of Related Art

With the progress of modern video technology, optical projection apparatuses have been widely used in the occasions of home theater, small conference report, and discussion. An optical projection apparatus includes an illumination system, a light valve, and a projection lens. The light source is configured to provide an illumination beam, the light valve is configured to convert the illumination beam into an image beam, and the projection lens is configured to project the image light beam onto a screen to form an image.

Generally speaking, the conventional illumination system in the optical projection apparatus usually use a set of red, blue and green light emitting diodes having the same having the same illuminating areas and dispersion angles as the light source of the illumination system. In other words, since these light emitting diodes have the same illuminating areas and dispersion angles, they also have the same E'tendue. Thus, by using a light consolidating unit and a collimating lens, the light beams provided by the light sources can be effectively collected and transmitted to the light valve. However, under such circumstance, the choice on light sources is very limited, and it is unable to choose a light source having a desirable optical performance but having a different illuminating area and dispersion angle.

Besides, if the light source having a desirable optical performance but having different illuminating area and dispersion angle is chosen as a different light source in the illumination system, the light beam provided by the light source is unable to be effectively connected and transmitted to the light valve due to the difference in E'tendue. In this situation, the color temperature balance and light output efficiency of the red, green, and blue light beams output by the illumination system are thus influenced.

U.S. Pat. No. 8,098,375 has disclosed an illumination system, including one or more light emitting diodes or light emitting diode array modules, a light splitter, and an optical concentrator. In addition, the optical concentrator may be a compound parabolic concentrator (CPC), a compound hyperbolic concentrator (CHC), a compound elliptical concentrator (CEC), or a taper optical tube. US Patent Publication No. 20070280622 has disclosed a light source assembly including a light guide element at the center of the optical axis. U.S. Pat. No. 8,684,555 has disclosed a light transmitting apparatus including a first light emitting diode and a first converter substance.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY OF THE INVENTION

The invention provides an illumination system, having a good light output efficiency.

The invention provides a projection apparatus, having a good light output efficiency.

Other objects and advantages of the invention can be further illustrated by the technical features broadly embodied and described as follows.

In order to achieve one or a portion of or all of the objects or other objects, an embodiment of the invention provides an illumination system. The illumination system includes a plurality of light source units, at least one light concentrating unit, and at least one taper tunnel. The light source units are configured to provide a plurality of light beams. The at least one light concentrating unit corresponds to and is disposed beside one of the light source units. The at least one light concentrating unit has a first illuminating surface, one of the light source units corresponding to the at least one light concentrating unit has a second illuminating surface, each of the other light source units that do not correspond to the at least one light concentrating unit has a third illuminating surface, and an area of the second illuminating surface is substantially different from an area of each of the third illuminating surfaces. The at least one taper tunnel corresponds to and is disposed beside the at least one concentrator. The at least one light concentrating unit is located between the corresponding one of the light source units and the taper tunnel, and the at least one taper tunnel has a fourth illuminating surface. In addition, an area of the fourth illuminating surface and the area of each of the third illuminating surfaces are the same in size and have corresponding shapes, namely the shapes are similar. Furthermore, a light consolidating unit is further included. The light consolidating unit has a fifth illuminating surface and is located on transmitting paths of the light beams. An area of the fifth illuminating surface of the light consolidating unit is not equal to the area of the fourth illuminating surface, and the area of the fifth illuminating surface is not equal to the area of each of the third illuminating surfaces.

In order to achieve one or a portion of or all of the objects or other objects, an embodiment of the invention provides a projection apparatus. The projection apparatus includes the aforesaid illumination system, a light valve, and a projection lens. The illumination system is configured to provide an illumination beam. The light valve is disposed on a transmitting path of the illumination beam and configured to convert the illumination beam into an image beam. The projection lens is disposed on the transmission path of the image beam.

According to an embodiment of the invention, the light concentrating unit includes a light guide and a concentrator. The light guide is located on the transmitting path of one of the light beams. The light guide has a phosphor to convert the light beam into a first color light, and color of the first color light is different from colors of the light beams provided by the other light source units. The concentrator is located on a transmitting path of the first color light. The first color light is transmitted to the taper tunnel and the light consolidating unit through the concentrator, and the light consolidating unit is configured to mix the first color light and the light beams provided by the other light source units into an illumination beam.

According to an embodiment of the invention, the light guide has a sixth illuminating surface, and a shape of the first illuminating surface of the light concentrating unit corresponds to a shape of the sixth illuminating surface of the light guide.

According to an embodiment of the invention, an area of the sixth illuminating surface of the light guide is smaller than the area of the first illuminating surface of the light concentrating unit.

According to an embodiment of the invention, the light guide is a cuboid, the one of the light source units corresponding to the at least one light concentrating unit is disposed at a long side of the cuboid, and the light beam provided by the light source unit enters the light guide from the long side.

According to an embodiment of the invention, the concentrator is a compound parabolic concentrator (CPC).

According to an embodiment of the invention, the light concentrating unit has a light incident surface located on the transmitting path of one of the light beams. The light concentrating unit has a phosphor to convert the light beam into a first color light, and a color of the first color light is different from colors of the light beams provided by the other light source units. The first color light is transmitted to the light consolidating unit sequentially through the light concentrating unit and the taper tunnel, and the light consolidating unit is configured to mix the first color light and the light beams provided by the other light source units into an illumination beam.

According to an embodiment of the invention, an area of the light incident surface of the light concentrating unit is smaller than an area of the first illuminating surface of the light concentrating unit.

According to an embodiment of the invention, a lens module is further included. The lens module is disposed between the at least one light concentrating unit and the taper tunnel.

According to an embodiment of the invention, each of the light source units includes at least one light emitting diode, and when the number of the at least one light emitting diode is plural, the light emitting diodes are arranged in an array.

According to an embodiment of the invention, the projection apparatus further includes a light homogenizing element. The light homogenizing element is located on the transmitting path of the illumination beam and between the illumination system and the light valve.

Based on the above, the embodiments at least have one of the following functions or effects. Since the projection apparatus and the illumination system according to the embodiments of the invention make use of the design that the area of the fifth illuminating surface of the light consolidating unit, the area of the fourth illuminating surface of the taper tunnel, and the area of each third illuminating surface correspond to each other, the light beams provided by the light sources are able to be collected effectively and transmitted to the light valve. Furthermore, the illumination system is capable of matching and adjusting the area of the fifth illuminating surface of the light consolidating unit, the area of the fourth illuminating surface of the taper tunnel, and the area of each third illuminating surface according to the E'tendue of the light valve, so as to improve the color temperature balance and light output efficiency of the red, green and blue light beams output by the illumination system. In addition, with the structural design of the light concentrating unit, the maximum light dispersion angle and uniformity of the first color light may also be appropriately adjusted to help design subsequent light coupling of the illumination system.

Other objectives, features and advantages of the invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
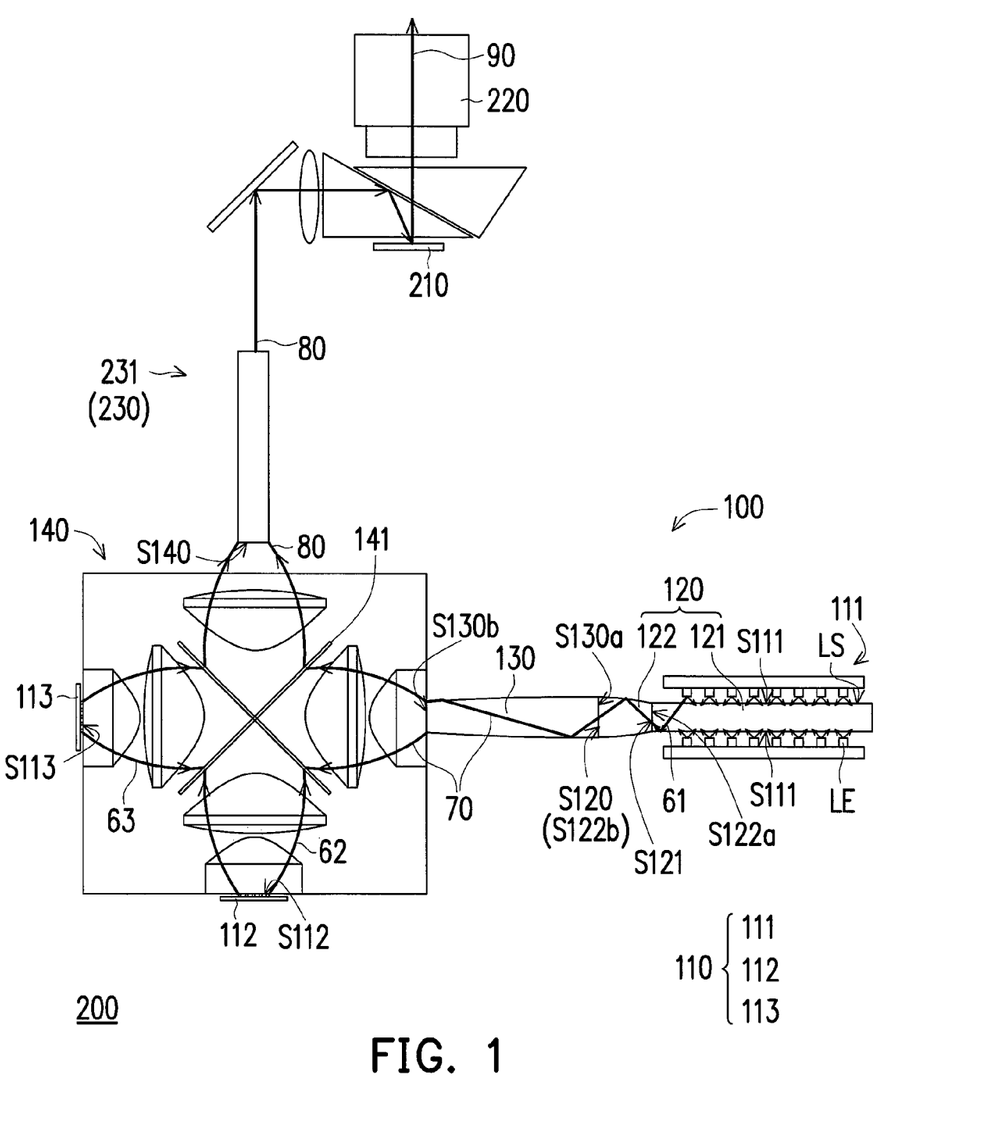
FIG. 1 is a schematic view illustrating a structure of a projection apparatus according to an embodiment of the invention.

FIG. 1 is a schematic view illustrating a structure of a projection apparatus according to an embodiment of the invention. Referring to FIG. 1, a projection apparatus 200 includes an illumination system 100, a light valve 210, and a projection lens 220. In this embodiment, the light valve 210 is a digital micro-mirror device (DMD) or a liquid-crystal-on-silicon (LCOS) panel, for example. However, in other embodiments, the light valve 210 may also be a transmissive liquid crystal panel or other light beam modulators.

Specifically, in this embodiment, the illumination system 100 includes a plurality of light source units 110, at least one light concentrating unit 120, at least one taper tunnel 130, and a light consolidating unit 140. More specifically, in this embodiment, the light source units 110 are configured to provide a plurality of light beams 61, 62, and 63, and respectively include at least one light emitting diode or laser diode. For example, in this embodiment, the light source unit 110 includes a first light source unit 111, a second light source unit 112, and a third light source unit 113. In addition, the first light source unit 111 and the second light source unit 112 respectively include a plurality of blue light emitting diodes. Based on the design of the manufacturer, the first light source unit 111 and the second light source unit 112 may be formed by blue light emitting diodes of different types and with different specifications, so as to provide the blue light beams 61 and 62. Furthermore, the third light source unit 113 includes a plurality of red light emitting diodes configured to provide the red light beam 63. However, the invention is not limited to the above description. In other embodiments, there may be only one light emitting diode LE, and a color thereof is not limited to blue or red. Besides, in this embodiment, the blue light emitting diodes and the red light emitting diodes are respectively arranged in an array.

Specifically, as shown in FIG. 1, the at least one light concentrating unit 120 corresponds to and is disposed beside one of the light source units 110 in this embodiment. For example, the light concentrating unit 120 is disposed beside the first light source unit 111 in this embodiment. However, the invention is not limited thereto. In other embodiments, there may be more than one light concentrating units 120, and the light concentrating units 120 may be respectively disposed beside the corresponding light source units 110. Also, in this embodiment, the light concentrating unit 120 has a first illuminating surface S120, the first light source unit 111 corresponding to the light concentrating unit 120 has a second illuminating surface S111, and the second light source unit 112 and the third light source unit 113 respectively have third illuminating surfaces S112 and S113. In addition, an area of the second illuminating surface S111 and areas of the third illuminating surfaces S112 and S113 are not substantially equal. Namely, in this embodiment, the first light source unit 111 and the second light source unit 112 (or the third light source unit 113) have different illuminating areas and dispersion angles. Moreover, the areas of the third illuminating surfaces S112 and S113 of the second light source unit 112 and the third light source unit 113 substantially correspond to and are equal to each other.

Figure 2:
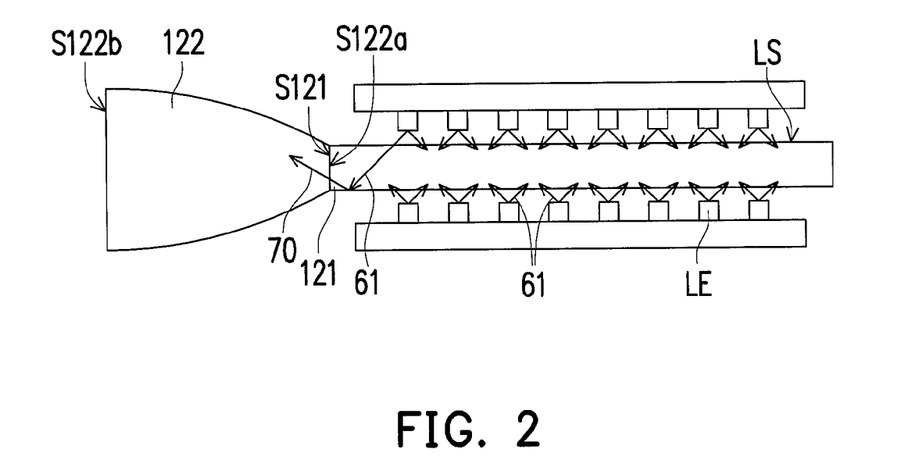
FIG. 2 is schematic view illustrating a light concentrating unit shown in FIG. 1.

FIG. 2 is schematic view illustrating a light concentrating unit shown in FIG. 1. Specifically, in this embodiment, the light concentrating unit 120 includes a light guide 121 and a concentrator 122. For example, the concentrator 122 is a compound parabolic concentrator (CPC), for example. However, the invention is not limited thereto. Specifically, in this embodiment, the light guide 121 is disposed on a transmitting path of one of the light beams 61 (i.e. the blue light beam 61), such as an exciting light beam. More specifically, in this embodiment, the light guide 121 is a cuboid or a plate, the light emitting diode LE of the first light source unit 111 is located at a long side LS of the cuboid, and the light beam 61 provided by the light emitting diode LE enters the light guide 121 from the long side LS. Furthermore, the light guide 121 has a phosphor for converting the light beam 61 into a first color light 70. For example, the phosphor of this embodiment is a phosphor generating green light, and the first color light 70 is green. However, the invention is not limited thereto. In other embodiments, as long as the color of the first color light 70 converted by a phosphor is different from colors of the light beams 62 and 63 of other light source units 110 (i.e. the second light source unit 112 and the third light source unit 113), and the first color light 70 is able to be mixed with the light beams 62 and 63 to generate white light, such phosphor may serve as the phosphor of the invention. Accordingly, when the light beam 61 provided by the first light source unit 111 is converted into the first color light 70 through the phosphor when the light beam 61 travels within the light guide 121. The first color light 70 is emitted from a sixth illuminating surface S121 of the light guide 121, so as to be transmitted to the concentrator 122.

More specifically, in this embodiment, the concentrator 122 is located on a transmitting path of the first color light 70. In addition, as shown in FIG. 2, the concentrator 122 has a light incident surface S122a and an illuminating surface S122b. In this embodiment, after being emitted from the sixth illuminating surface S121 of the light guide 121, the first color light 70 enters the concentrator 122 from the light incident surface S122a of the concentrator 122, and is then transmitted to the taper tunnel 130. Thus, in this embodiment, the illuminating surface S122b of the concentrator 122 is the first illuminating surface S120 of the light concentrating unit 120. In addition, shapes of the light incident surface S122a and the illuminating surface S122b correspond to a shape of the sixth illuminating surface S121 of the light guide 121, so as to facilitate transmission of the first color light 70. In other words, the shape of the first illuminating surface S120 of the light concentrating unit 120 corresponds to the shape of the sixth illuminating surface S121 of the light guide 121, so as to facilitate the transmission of the first color light 70.

Besides, as shown in FIG. 2, in this embodiment, an area of the sixth illuminating surface S121 of the light guide 121 is smaller than the area of the first illuminating surface S120 of the light concentrating unit 120. By using the light concentrating unit 120, the issue of the energy of the first color light 70 excited by the phosphor in the light guide 121 being concentrated at a larger angle is eliminated, and a maximum light dispersion angle and uniformity of the first color light 70 are appropriately adjusted. Thus, such configuration help design subsequent light coupling of the illumination system 100.

Then, referring to FIG. 1 again, in this embodiment, the first color light 70 is transmitted to the taper tunnel 130 and the light consolidating unit 140 through the concentrator 122. Specifically, in this embodiment, the at least one taper tunnel 130 corresponds to and is disposed beside the at least one light concentrating unit 120. The at least one light concentrating unit 120 is located between the corresponding first light source unit 111 and taper tunnel 130, and the at least one taper tunnel 130 has a fourth illuminating surface S130b. More specifically, as shown in FIG. 1, when the first color light 70 enters the taper tunnel 130 and is emitted from the fourth illuminating surface S130b of the taper tunnel 130, an angle of the first color light 70 is modified to become greater and the uniformity of the first color light 70 is adjusted to help design subsequent light coupling.

Figure 3A:
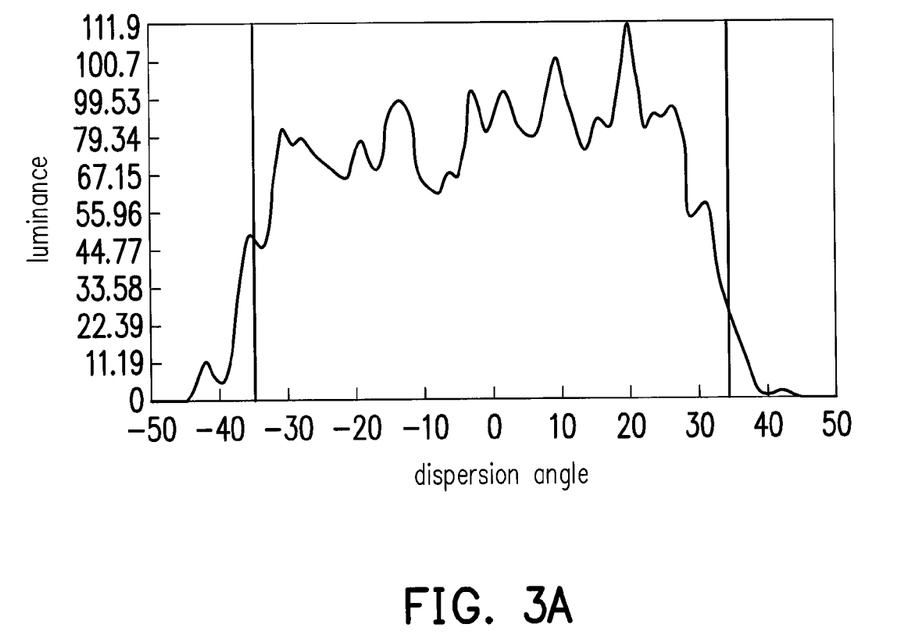
FIG. 3A is a diagram simulating a dispersion angle of light when a first color light does not pass through a taper tunnel shown in FIG. 1.
Figure 3B:
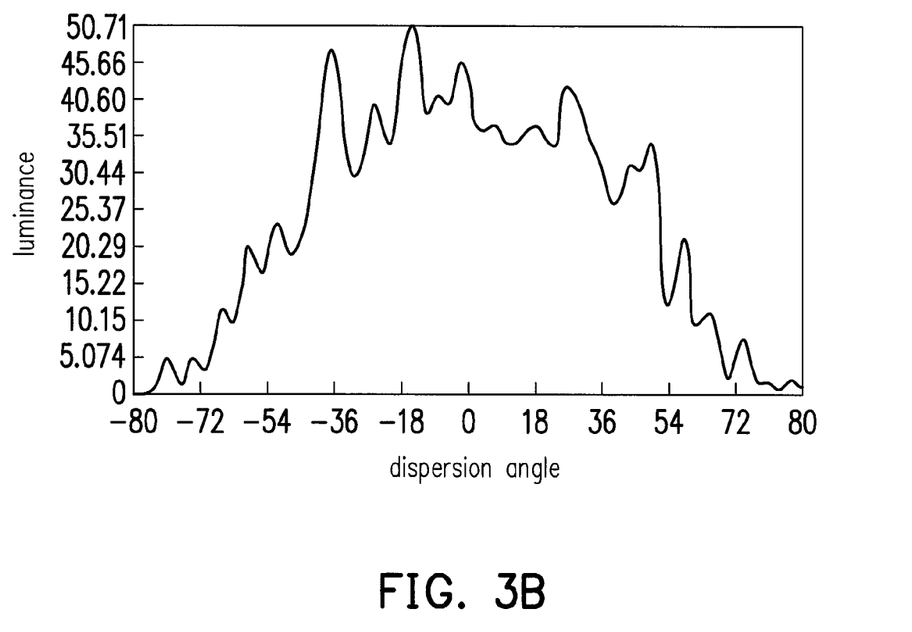
FIG. 3B is a diagram simulating a dispersion angle of light in an X direction after the first color light passes the taper tunnel shown in FIG. 1.
Figure 3C:
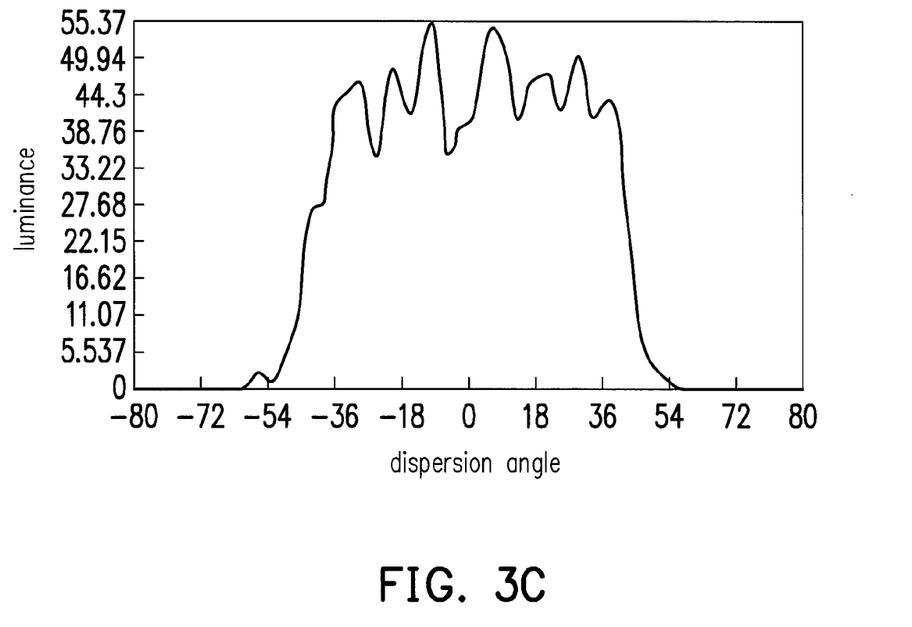
FIG. 3C is a diagram simulating a dispersion angle of light in a Y direction after the first color light passes the taper tunnel shown in FIG. 1.

FIG. 3A is a diagram simulating data of the dispersion angle of light when the first color light does not pass through the taper tunnel shown in FIG. 1. FIG. 3B is a diagram simulating data of the dispersion angle of light in an X direction after the first color light passes the taper tunnel shown in FIG. 1. FIG. 3C is a diagram simulating data of the dispersion angle of light in a Y direction after the first color light passes the taper tunnel shown in FIG. 1. For example, as shown in FIG. 3A, before the first color light 70 passes through the taper tunnel 130, the dispersion angle of the first color light 70 is symmetrical in this embodiment, and the maximum dispersion angle of the first color light 70 in X and Y directions is 34 degrees, for example. However, after the first color light 70 passes through the taper tunnel 130, since proportions changed in the X and Y directions of cross-sectional areas of a light incident surface S130a and the fourth illuminating surface S130b is not the same, the dispersion angle of the first color light 70 is adjusted to make the dispersion angle asymmetrical in the X and Y directions.

For example, in this embodiment, it is assumed that a width of the light incident surface S130a of the taper tunnel 130 is about 5.20 mm, and a height of the light incident surface S130a is about 3.30 mm, while a width of the fourth illuminating surface 130b of the taper tunnel 130 is about 3.24 mm and a height of the fourth illuminating surface S130b is about 2.50 mm, for example. Thus, a difference in width between the light incident surface S130a and the fifth illuminating surface S130b of the taper tunnel 130 is about 62.3%. Such difference makes the dispersion angle of the first color light 70 in the X direction increase to the extent of approximately 70 degrees (as shown in FIG. 3B). In addition, a difference in height between the light incident surface S130a and the fifth illuminating surface S130b of the taper tunnel 130 is about 75.8%. Such difference makes the dispersion angle of the first color light 70 in the Y direction increase, but to a smaller extent of approximately 50 degrees (as shown in FIG. 3C). It should be noted that the numerical values described herein are only provided for an illustrative purpose, and the invention is not limited to these values.

In this way, an illuminating area and the dispersion angle of the first color light 70 are adjusted to be the same as those of the light beams 62 and 63 provided by the second light source unit 112 (or the third light source 113) to help subsequent light coupling of the light consolidating unit 140.

In addition, as shown in FIG. 1, the light consolidating unit 140 has a fifth illuminating surface S140. The fifth illuminating surface S140 is located on transmitting paths of the light beams 62 and 63 and the first color light 70. For example, the light consolidating unit 140 includes an X-plate 141 and consolidates the light beams 70, 62, and 63 in different colors to mix the light beams 70, 62, and 63 into an illuminating light beam 80.

To be more specific, an area of the fifth illuminating surface S140 of the light consolidating unit 140 and the area of the fourth illuminating surface S130b of the taper tunnel 130 are not equal, and the area of the fifth illuminating surface S140 and the area of the third illuminating surface S112 or S113 of the second light source unit 112 or the third light source unit 113 are not equal.

In addition, in this embodiment, the area of the fourth illuminating surface S130b of the taper tunnel 130 and the area of the of the third illuminating surface S112 or S113 of the second light source unit 112 or the third light source unit 113 substantially correspond to each other and are equal. In this way, the light beams 62 and 63 and the first color light 70 provided by the different light source units 110 are able to be effectively collected and transmitted to the light valve 210.

In addition, in this embodiment, the area of the fifth illuminating surface S140 of the light consolidating unit 140, the area of the fourth illuminating surface S130b of the taper tunnel 130, and the area of the third illuminating surface S112 of the second light source unit 112 or the third illuminating surface S113 of the third light source unit 113 may be matched and adjusted according to an E'tendue of the light valve 210, so as to improve a color temperature balance and light output efficiency of red, green, and blue light beams output by the illumination system 100. For example, in this embodiment, the light output efficiency of the illumination system 100 is improved by approximately 73%.

Thus, by adopting a design that the area of the fourth illuminating surface S130b of the taper tunnel 130 and the area of the third illuminating surface S112 of the second light source unit 112 or the third illuminating surface S113 of the third light source unit 113 correspond to each other, the light beams 62 and 63 and the first color light 70 provided by the different light source units 110 are able to be effectively collected and transmitted to the light valve 210. Furthermore, the illumination system 100 is capable of matching and adjusting the area of the fifth illuminating surface S140 of the light consolidating unit 140, the area of the fourth illuminating surface S130b of the taper tunnel 130, and the area of the third illuminating surfaces S112 and S113 of the light source units 110 according to the E'tendue of the light valve 210, so as to improve the color temperature balance and light output efficiency of the red, green and blue light beams output by the illumination system 100. In addition, with a structural design of the light concentrating unit 120, the maximum light dispersion angle and uniformity of the first color light 70 may also be appropriately adjusted to help design subsequent light coupling of the illumination system 100.

Besides, as shown in FIG. 1, the projection system further includes a light homogenizing element 230. The light homogenizing element 230 is located on a transmitting path of the illumination light beam 80 and between the illumination system 100 and the light valve 210. In this embodiment, the light homogenizing element 230 includes a light integration rod 231. However, the invention is not limited thereto. More specifically, as shown in FIG. 1, when the illumination beam 80 is transmitted from the illumination system 100 to the light homogenizing element 230, the light homogenizing element 230 may homogenize and transmit the illumination beam 80 to the light valve 210.

In addition, as shown in FIG. 1, the light valve 210 is disposed on the transmitting path of the illumination beam 80, so as to convert the illumination beam 80 into an image beam 90. The projection lens 220 is disposed on a transmitting path of the image beam 90 and is configured to project the image beam 90 onto a screen (not shown) to form an image. Since the light valve 210 sequentially converts the illumination beam 80 into the image beam 90 of different colors after the illumination beam 80 converges to the light valve 210, the image projected by the image beam 90 converted by the light valve 210 is a color image.

Figure 4:
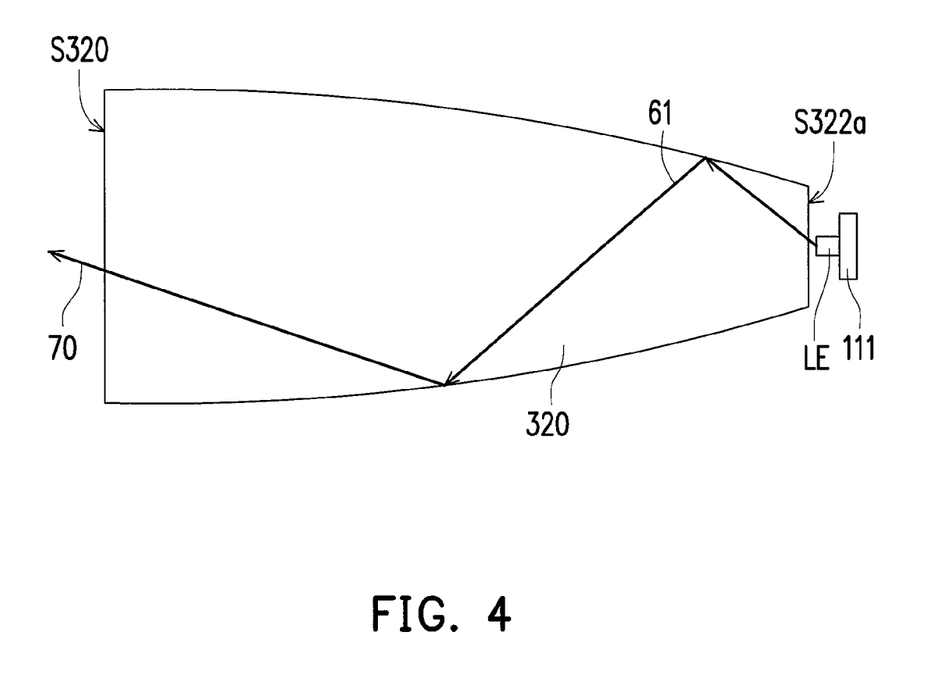
FIG. 4 is a schematic view illustrating another light concentrating unit of FIG. 1.

FIG. 4 is a schematic view illustrating another light concentrating unit of FIG. 1. Referring to FIG. 4, a light concentrating unit 320 is similar to the light concentrating unit 120 shown in FIG. 2, and differences therebetween are described below. In this embodiment, the light concentrating unit 320 is a compound parabolic concentrator. In addition, a light incident surface S322a of the light concentrating unit 320 is disposed on the transmitting path of one of the light beams 61, and the light beam 61 may be directly transmitted to a first illuminating surface S320 of the light concentrating unit 320 through the light incident surface S322a of the light concentrating unit 320 to be emitted, so it is not necessary to dispose the light guide 121. Also, in this embodiment, the light concentrating unit 320 has a phosphor. When the light beam 61 enters the light concentrating unit 320, the light beam 61 is converted into the first color light 70 by the phosphor in the light concentrating unit 320. Then, the first color light 70 is emitted from the first light illuminating surface S320 of the light concentrating unit 320.

Furthermore, as shown in FIG. 4, an area of the light incident surface S322a of the light concentrating unit 320 is smaller than an area of the first illuminating surface S320 of the light concentrating unit 320 in this embodiment. Thus, with the light concentrating unit 320, the issue of the energy of the first color light 70 being concentrated at a larger angle is eliminated. Also, the maximum light dispersion angle and uniformity of the first color light 70 may be appropriately adjusted to help design subsequent light coupling of the illumination system 100. In this way, since the light concentrating unit 320 is also capable of adjusting the maximum light dispersion angle and uniformity of the first color light 70, the light concentrating unit 320 may also be used in the projection apparatus 200 of FIG. 1 to allow the projection apparatus 200 to provide similar functions and effects. Thus, details in this regard will not be further reiterated below.

Figure 5A:
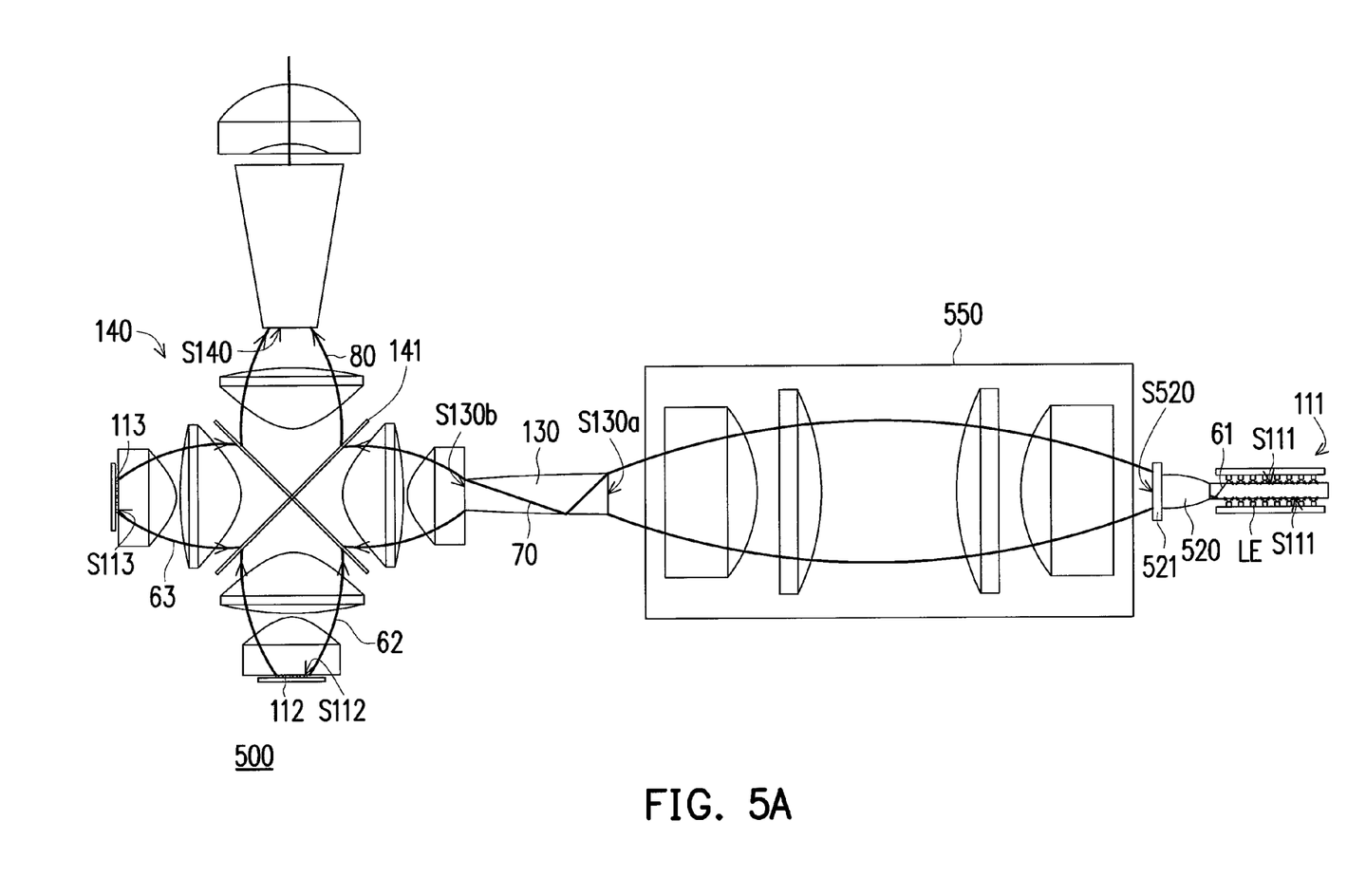
FIG. 5A is a schematic view illustrating another illumination system of FIG. 1.
Figure 5B:
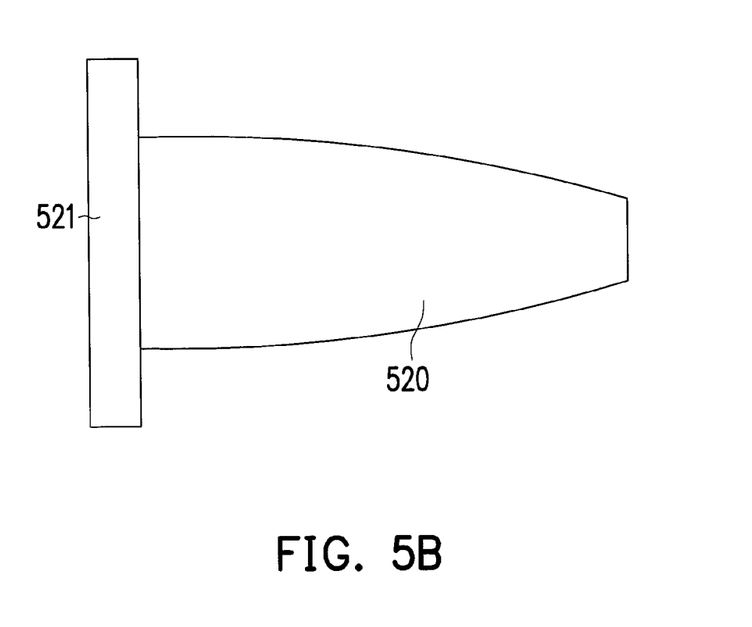
FIG. 5B is a schematic view illustrating yet another light concentrating unit shown in FIG. 1.

FIG. 5A is a schematic view illustrating another illumination system of FIG. 1. FIG. 5B is a schematic view illustrating a light concentrating unit shown in FIG. 1. Referring to FIGS. 5A and 5B, an illumination system 500 is similar to the illumination system 100 shown in FIG. 1, and differences therebetween are described in the following. In an embodiment, a surface of a light concentrating unit 520 of the illumination system 500 has a cover glass 521, and the illumination system 500 further includes a relay lens module 550. Specifically, in this embodiment, the cover glass 521 serves as a clamping surface of the light concentrating unit 520, and the relay lens module 550 is capable of positioning the first color light 70 emitted from the first illuminating surface S520 of the light concentrating unit 520 to the light incident surface S130a of the taper tunnel 130. In this way, a risk that the taper tunnel 130 is unable to be disposed closely to the first illuminating surface S520 of the light concentrating unit 520 when the cover glass 521 is disposed, thus resulting in loss of brightness, is avoided. Namely, in this embodiment, the relay lens module 550 is capable of correspondingly positioning the first color light 70 emitted from the first illuminating surface S520 of the concentrating unit 520 to the light incident surface S130a of the taper tunnel 130, thereby keeping a light output efficiency of the illumination system 500 similar to that of the illumination system 100. Thus, the illumination system 500 has similar functions and effects as those of the illumination system 100, and the illumination system 500 may also be used in the projection apparatus 200 shown in FIG. 1 to allow the projection apparatus 200 to provide similar functions and effects. Thus, details in this regard will not be further reiterated below.

Figure 6:
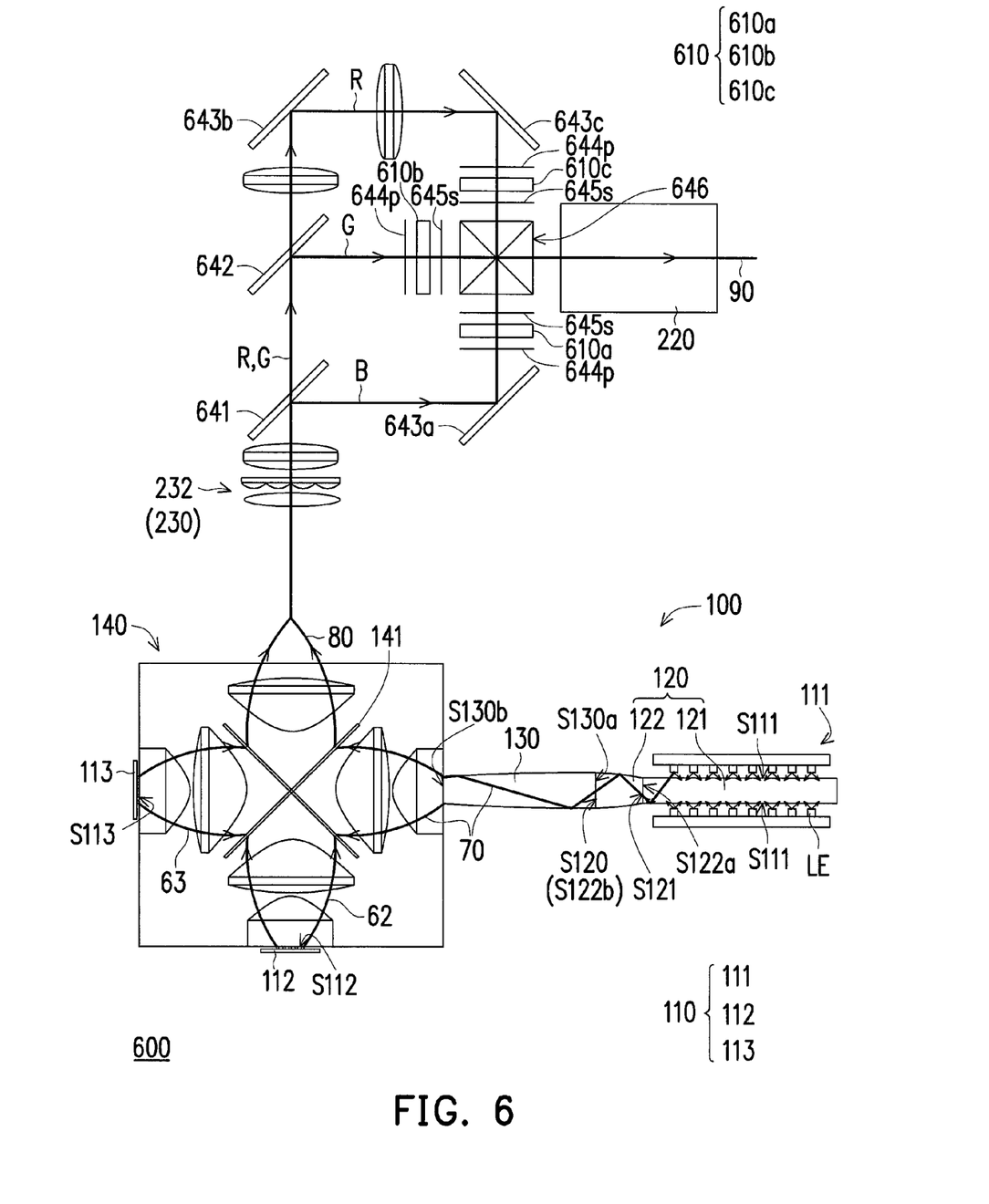
FIG. 6 is a schematic view illustrating a structure of a projection apparatus according to another embodiment of the invention.

FIG. 6 is a schematic view illustrating a structure of a projection apparatus according to another embodiment of the invention. Referring to FIG. 6, a projection apparatus 600 is similar to the projection apparatus 200 shown in FIG. 1, and differences therebetween are described below. In this embodiment, a light valve 610 of the projection apparatus 600 is formed by three transmissive liquid crystal panels 610a, 610b, and 610c. More specifically, in this embodiment, the projection apparatus 600 further includes a first dichroic mirror 641, a second dichroic mirror 642, three reflective mirrors 643a, 643b, and 643c, three p-polarizers 644p, three s-polarizers 645s, the three transmissive liquid crystal panels 610a, 610b, and 610c, and an X-plate 646. In addition, the light homogenizing element 230, a lens array 232, and the first dichroic mirror 641 are sequentially arranged on the transmitting path of the illumination beam 80.

More specifically, the first dichroic mirror 641 is suitable for a red light R and a green light G to pass but reflects a blue light B, while the second dichroic mirror 642 is suitable for the red light R to pass and reflect the green light G. The reflective mirror 643a is disposed on a transmitting path of the blue light B to reflect the blue light B, while the reflective mirrors 643b and 643c are disposed on a transmitting path of the red light R to reflect the red light R. After respectively passing through the corresponding p-polarizers 644p, the transmissive liquid crystal panels 610a, 610b, and 610c, and the s-polarizers 645s, the red light R, green light G, and blue light B are projected to the X-plate 646 to form the image beam 90 through the X-plate 646. In addition, the projection lens 220 is disposed on the transmitting path of the image beam 90 and is capable of projecting the image beam 90.

Moreover, in this embodiment, the projection apparatus 600 may make use of the design that the area of the fourth illuminating surface S130b of the taper tunnel 130 and the area of the third illuminating surface S112 of the second light source unit 112 or the third illuminating surface S113 of the third light source unit 113 are the same and correspond to each other to ensure that the light beams 62 and 63 and the first color light 70 provided by the different light source units 110 are effectively connected and transmitted to the light valve 610. Furthermore, the illumination system 100 is capable of matching and adjusting the area of the fifth illuminating surface S140 of the light consolidating unit 140, the area of the fourth illuminating surface S130b of the taper tunnel 130, and the area of the third illuminating surface S112 or S113 of the second light source unit 112 or the third light source unit 113 according to an E'tendue of the light valve 610, so as to improve the color temperature balance and light output efficiency of the red, green and blue light beams output by the illumination system 100. In addition, with the structural design of the light concentrating unit 120, the maximum light dispersion angle and uniformity of the first color light 70 may also be appropriately adjusted to help design subsequent light coupling of the illumination system 100. Therefore, the projection apparatus 600 may also have similar functions and effects as those of the projection apparatus 200. Therefore, further details in this respect will not be reiterated below.

In view of the foregoing, since the projection apparatus and the illumination system according to the embodiments of the invention make use of the design that the area of the fourth illuminating surface of the taper tunnel and the area of each third illuminating surface are the same as and correspond to each other, the light beams provided by the light sources are able to be collected effectively and transmitted to the light valve. Furthermore, the illumination system is capable of matching and adjusting the area of the fifth illuminating surface of the light consolidating unit, the area of the fourth illuminating surface of the taper tunnel, and the area of each third illuminating surface according to the E'tendue of the light valve, so as to improve the color temperature balance and light output efficiency of the red, green and blue light beams output by the illumination system. In addition, with the structural design of the light concentrating unit, the maximum light dispersion angle and uniformity of the first color light may also be appropriately adjusted to help design subsequent light coupling of the illumination system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, "first", "second", etc. mentioned in the specification and the claims are merely used to name the elements and should not be regarded as limiting the upper or lower bound of the number of the components/devices.

What is claimed is:

1. An illumination system, comprising:
    a plurality of light source units, configured to provide a plurality of light beams;
    at least one light concentrating unit, corresponding to and disposed beside one of the light source units, wherein the at least one light concentrating unit has a first illuminating surface, one of the light source units corresponding to the at least one light concentrating unit has a second illuminating surface, each of the other light source units that do not correspond to the at least one light concentrating unit has a third illuminating surface, and an area of the second illuminating surface is substantially different from an area of each of the third illuminating surfaces; and
    at least one taper tunnel, corresponding to and disposed beside the at least one light concentrating unit, wherein the at least one light concentrating unit is located between the corresponding one of the light source units and the taper tunnel, the at least one taper tunnel has a fourth illuminating surface, and an area of the fourth illuminating surface is equal to the area of each of the third illuminating surfaces.

2. The illumination system as claimed in claim 1, further comprising a light consolidating unit having a fifth illuminating surface, and located on transmitting paths of the light beams, wherein an area of the fifth illuminating surface of the light consolidating unit is not equal to the area of the fourth illuminating surface, and the area of the fifth illuminating surface is not equal to the area of each of the third illuminating surfaces.

3. The illumination system as claimed in claim 2, wherein the at least one light concentrating unit comprises:
    a light guide, located on the transmitting path of one of the light beams, wherein the light guide has a phosphor to convert the light beam into a first color light, and color of the first color light is different from colors of the light beams provided by the other light source units; and
    a concentrator, located on a transmitting path of the first color light, wherein the first color light is transmitted to the taper tunnel and the light consolidating unit through the concentrator, and the light consolidating unit is configured to mix the first color light and the light beams provided by the other light source units into an illumination beam.

4. The illumination system as claimed in claim 3, wherein the light guide has a sixth illuminating surface, and a shape of the first illuminating surface of the light concentrating unit corresponds to a shape of the sixth illuminating surface of the light guide.

5. The illumination system as claimed in claim 4, wherein an area of the sixth illuminating surface of the light guide is smaller than the area of the first illuminating surface of the light concentrating unit.

6. The illumination system as claimed in claim 3, wherein the light guide is a cuboid, the one of the light source units corresponding to the at least one light concentrating unit is disposed at a long side of the cuboid, and the light beam provided by the light source unit enters the light guide from the long side.

7. The illumination system as claimed in claim 3, wherein the concentrator is a compound parabolic concentrator.

8. The illumination system as claimed in claim 2, wherein the at least one light concentrating unit has a light incident surface located on the transmitting path of one of the light beams, the light concentrating unit has a phosphor to convert the light beam into a first color light, a color of the first color light is different from colors of the light beams provided by the other light source units, the first color light is transmitted to the light consolidating unit sequentially through the light concentrating unit and the taper tunnel, and the light consolidating unit is configured to mix the first color light and the light beams provided by the other light source units into an illumination beam.

9. The illumination system as claimed in claim 8, wherein an area of the light incident surface of the at least one light concentrating unit is smaller than an area of the first illuminating surface of the light concentrating unit.

10. The illumination system as claimed in claim 1, further comprises a lens module disposed between the at least one light concentrating unit and the taper tunnel.

11. The illumination system as claimed in claim 1, wherein each of the light source units comprises at least one light emitting diode, and when the number of the at least one light emitting diode is plural, the light emitting diodes are arranged in an array.

12. A projection apparatus, comprising:
an illuminating system, providing an illuminating beam, the illumination system comprising:
a plurality of light source units, configured to provide a plurality of light beams;
at least one light concentrating unit, corresponding to and disposed beside one of the light source units, wherein the at least one light concentrating unit has a first illuminating surface, one of the light source units corresponding to the at least one light concentrating unit has a second illuminating surface, each of the other light source units that do not correspond to the at least one light concentrating unit has a third illuminating surface, and an area of the second illuminating surface is substantially different from an area of each of the third illuminating surfaces;
at least one taper tunnel, corresponding to and disposed beside the at least one light concentrating unit, wherein the at least one light concentrating unit is located between the corresponding one of the light source units and the taper tunnel, the at least one taper tunnel has a fourth illuminating surface, and an area of the fourth illuminating surface is equal to the area of each of the third illuminating surfaces;
a light valve, disposed on a transmitting path of the illumination beam, and configured to convert the illumination beam into an image beam; and
a projection lens, disposed on the transmission path of the image beam.

13. The projection apparatus as claimed in claim 12, further comprising a light consolidating unit having a fifth illuminating surface and located on transmitting paths of the light beams, wherein an area of the fifth illuminating surface of the light consolidating unit is not equal to the area of the fourth illuminating surface, and the area of the fifth illuminating surface is not equal to the area of each of the third illuminating surfaces.

14. The projection apparatus as claimed in claim 13, wherein the at least one light concentrating unit comprises:
a light guide, located on the transmitting path of one of the light beams, wherein the light guide has a phosphor to convert the light beam into a first color light, and color of the first color light is different from colors of the light beams provided by the other light source units; and
a concentrator, located on a transmitting path of the first color light, wherein the first color light is transmitted to the taper tunnel and the light consolidating unit through the concentrator, and the light consolidating unit is configured to mix the first color light and the light beams provided by the other light source units into an illumination beam.

15. The projection apparatus as claimed in claim 14, wherein the light guide has a sixth illuminating surface, and a shape of the first illuminating surface of the light concentrating unit corresponds to a shape of the sixth illuminating surface of the light guide.

16. The projection apparatus as claimed in claim 15, wherein an area of the sixth illuminating surface of the light guide is smaller than the area of the first illuminating surface of the light concentrating unit.

17. The projection apparatus as claimed in claim 14, wherein the light guide is a cuboid, the one of the light source units corresponding to the at least one light concentrating unit is disposed at a long side of the cuboid, and the light beam provided by the light source unit enters the light guide from the long side.

18. The projection apparatus as claimed in claim 14, wherein the concentrator is a compound parabolic concentrator.

19. The projection apparatus as claimed in claim 13, wherein the at least one light concentrating unit has a light incident surface located on the transmitting path of one of the light beams, the light concentrating unit has a phosphor to convert the light beam into a first color light, a color of the first color light is different from colors of the light beams provided by the other light source units, the first color light is transmitted to the light consolidating unit sequentially through the light concentrating unit and the taper tunnel, and the consolidating unit is configured to mix the first color light and the light beams provided by the other light source units into an illumination beam.

20. The projection apparatus as claimed in claim 19, wherein an area of the light incident surface of the at least one light concentrating unit is smaller than an area of the first illuminating surface of the light concentrating unit.

21. The projection apparatus as claimed in claim 12, wherein each of the light source units comprises at least one light emitting diode, and when the number of the at least one light emitting diode is plural, the light emitting diodes are arranged in an array.

22. The projection apparatus as claimed in claim 12, further comprising a light homogenizing element located on the transmitting path of the illumination beam and between the illumination system and the light valve.

* * * * *